(12) United States Patent
Jernigan, IV (10) Patent No.: US 11,857,485 B2
(45) Date of Patent: Jan. 2, 2024

(54) KNEE WALKER WITH FOUR-WHEEL STEERING

(71) Applicant: ROVER MOBILITY, LLC, Evans, GA (US)

(72) Inventor: Harry W. Jernigan, IV, Evans, GA (US)

(73) Assignee: ROVER MOBILITY, LLC, Evans, GA (US)

( * ) Notice: Subject to any disclaimer, the term of this patent is extended or adjusted under 35 U.S.C. 154(b) by 0 days.

(21) Appl. No.: 17/892,612

(22) Filed: Aug. 22, 2022

(65) Prior Publication Data

US 2022/0387247 A1    Dec. 8, 2022

Related U.S. Application Data

(63) Continuation of application No. 16/876,760, filed on May 18, 2020, now Pat. No. 11,452,663.

(60) Provisional application No. 62/861,376, filed on Jun. 14, 2019.

(51) Int. Cl.
| | | |
|---|---|---|
| *A61H 3/04* | (2006.01) | |
| *B62K 5/003* | (2013.01) | |
| *B62K 25/02* | (2006.01) | |
| *A61H 3/00* | (2006.01) | |

(52) U.S. Cl.
CPC ............. *A61H 3/04* (2013.01); *B62K 5/003* (2013.01); *B62K 25/02* (2013.01); *A61H 2003/005* (2013.01); *A61H 2003/046* (2013.01); *B62K 2025/025* (2013.01)

(58) Field of Classification Search
CPC ........................ A61H 3/04; A61H 2003/005
See application file for complete search history.

(56) References Cited

U.S. PATENT DOCUMENTS

| 2,001,647 | A | | 5/1935 | Alt | |
|---|---|---|---|---|---|
| 2,571,750 | A | * | 10/1951 | William | ................... B62K 9/00 |
| | | | | | 280/87.01 |
| 3,398,971 | A | | 8/1968 | Seidel | |
| 3,507,511 | A | | 4/1970 | Lloyd | |
| 3,820,811 | A | * | 6/1974 | Lapham | ................. B62D 13/04 |
| | | | | | 280/99 |
| 4,934,726 | A | * | 6/1990 | Daenens | ................ B62D 13/04 |
| | | | | | 280/47.11 |
| 6,105,982 | A | | 8/2000 | Howell | |

(Continued)

FOREIGN PATENT DOCUMENTS

| DE | 102017104702 | B4 | 1/2019 | |
|---|---|---|---|---|
| GB | 364269 | A | 1/1932 | |
| WO | WO-9919198 | A1 * | 4/1999 | ............. B62B 3/001 |

OTHER PUBLICATIONS

International Search Report & Written Opinion for PCT/US2020/033418; dated Sep. 2, 2020; 14 pages.

*Primary Examiner* — Noah Chandler Hawk
(74) *Attorney, Agent, or Firm* — GARDNER GROFF & GREENWALD, PC (57) ABSTRACT

A knee walker with four-wheel steering. The knee walker includes a frame, at least one front axle assembly, at least one rear axle assembly, a kneeling pad assembly, and a steering system. The steering system is configured to turn the rear axle assembly in the opposite direction from the front axle assembly. The opposing angles of the front and rear wheels enable the knee walker to perform tighter turns by eliminating rear wheel drag.

9 Claims, 7 Drawing Sheets

(56) References Cited

U.S. PATENT DOCUMENTS

| | | | | |
|---|---|---|---|---|
| 6,517,092 B2* | 2/2003 | Humphrey | ............ | B62K 3/002 |
| | | | | 280/87.043 |
| 6,619,680 B2* | 9/2003 | Platteeuw | ............... | B62D 13/04 |
| | | | | 280/100 |
| 7,780,180 B2* | 8/2010 | Hoepner | .................. | A61H 3/04 |
| | | | | 280/263 |
| 7,988,163 B2* | 8/2011 | Accetta | .................... | B62K 3/16 |
| | | | | 482/68 |
| 8,348,288 B1* | 1/2013 | Laughon, Sr. | ........... | A61H 3/04 |
| | | | | 280/87.021 |
| 8,608,184 B2* | 12/2013 | Janis | ........................ | A61H 3/04 |
| | | | | 280/87.021 |
| 8,827,284 B2* | 9/2014 | Walther | ................. | B62K 5/023 |
| | | | | 280/87.041 |
| 8,857,832 B2* | 10/2014 | Smith | .................... | B62K 21/16 |
| | | | | 280/87.043 |
| 8,915,517 B1* | 12/2014 | Jacobs | ........................ | B62J 9/20 |
| | | | | 280/727 |
| 9,227,684 B2* | 1/2016 | Smith | ..................... | B62K 21/16 |
| 9,376,141 B1* | 6/2016 | Shi | ........................ | B62D 7/1509 |
| 2007/0182116 A1* | 8/2007 | Davey | ..................... | B62K 3/16 |
| | | | | 280/87.05 |
| 2008/0284125 A1* | 11/2008 | Ramm | ................... | B62K 3/002 |
| | | | | 280/263 |
| 2009/0058036 A1 | 3/2009 | Hoepner et al. | | |
| 2012/0043730 A1* | 2/2012 | Walther | .................. | B62K 5/05 |
| | | | | 280/62 |
| 2014/0097592 A1* | 4/2014 | Smith | .................... | B62K 5/003 |
| | | | | 280/267 |
| 2016/0058636 A1 | 3/2016 | Chang | | |

* cited by examiner

KNEE WALKER WITH FOUR-WHEEL STEERING

CROSS-REFERENCE TO RELATED APPLICATION

This application is a continuation of U.S. Non-Provisional patent application Ser. No. 16/876,760 filed May 18, 2020, which claims the benefit of U.S. Provisional Patent Application Ser. No. 62/861,376 filed Jun. 14, 2019, the entireties of which are hereby incorporated herein by reference for all purposes.

TECHNICAL FIELD

The present invention relates generally to the field of ambulatory devices, and more particularly to a knee walker or knee scooter with four-wheel steering for improved maneuverability and stability in turning.

BACKGROUND

An injury to the knee, lower leg, ankle, or foot can have life altering consequences. In many cases, a person suffering such an injury may be condemned to weeks, or longer, of misery on crutches or a wheelchair, often making normal everyday activities painful, dangerous and, in many cases, difficult or impossible.

Prior to the invention of knee walkers or knee scooters, many patients with such injuries had no choice but to limit activity during recovery and use crutches or a wheelchair when necessary. Unfortunately, neither choice allows the patient to move freely and go about the patient's daily routine. When using crutches, the patient's arms support the patient's body weight and the patient's arms and upper back are used for mobility. Similarly, a patient in a wheelchair must rely solely on the patient's upper body strength and the patient is restricted to a seated position. And it can be difficult to open and close doors, maneuver through tight spaces, and to carry items when using crutches or a wheelchair.

On a knee walker, the larger muscles of the patient's legs are leveraged instead. Using these larger muscles results in less upper body pain, less patient fatigue, and less chance of re-injury should the patient lose balance and the injured leg suffers an accidental impact. A knee walker also provides the patient with the ability to be hands-free while standing still enabling the user to accomplish many daily tasks at home, at work or on the go.

While a standard knee walker provides many benefits over crutches and wheelchairs, some users would prefer greater maneuverability and stability than presently known knee walkers provide. It is to the provision of an improved knee walker meeting these and other needs that the present invention is primarily directed.

SUMMARY

In example embodiments, the present invention provides an improved knee walker (also referred to as a knee scooter) or other mobility or ambulatory care device that enhances maneuverability and stability in operation. In example forms, the improved knee walker includes a four-wheel steering system to control the turning or articulation of both the front wheels and the rear wheels. In example embodiments, the steering system includes a linkage coupling turning of the front wheels with turning of the rear wheels, for example turning the front wheels in the direction the user steers the walker's handlebar and turning the rear wheels in the opposite direction. In this manner, a tighter turning radius may be provided, and stability in turns may be improved due to shifting of the yaw axis toward the center of gravity.

In one aspect, the present invention relates to knee walkers or other mobility or ambulatory care devices with four-wheel steering. The knee walker includes a body frame, at least one front axle assembly, at least one rear axle assembly, a knee-pad assembly, and a steering system. The steering system preferably includes a linkage mechanism configured to turn the front axle assembly in a first direction and the rear axle assembly in an opposite second direction. The opposing turn angles of the front and rear wheels enable the knee walker to perform tighter turns by eliminating rear wheel drag.

In another aspect, the invention relates to four-wheel steering systems for knee walkers or other mobility or ambulatory care devices. The four-wheel steering system uses one or more linking members such as a plurality of cables and/or tie rods to control the turning of the front wheels and the rear wheels together. In another form, the four-wheel steering system uses only cables or only ties rods to achieve the same purpose. In yet another form, the four-wheel steering system uses a system of gears or other linking elements to control the turning of the front and rear wheels, or axles together.

In still another aspect, the invention relates to a four-wheel steering system for a knee walker or other mobility or ambulatory care device with a pivoting rear axle assembly. The rear axle assembly, as a whole, is configured to pivot relative to the knee walker body frame. The rear wheels mounted to the rear axle assembly, on the other hand, are configured not to pivot relative to the rear axle assembly. The four-wheel steering system includes tie rods to control the turning of the front and rear axle assemblies.

In another aspect, the invention relates to a method of steering a knee walker or other ambulatory device by linking turning of the rear wheels to turning of the front wheels.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
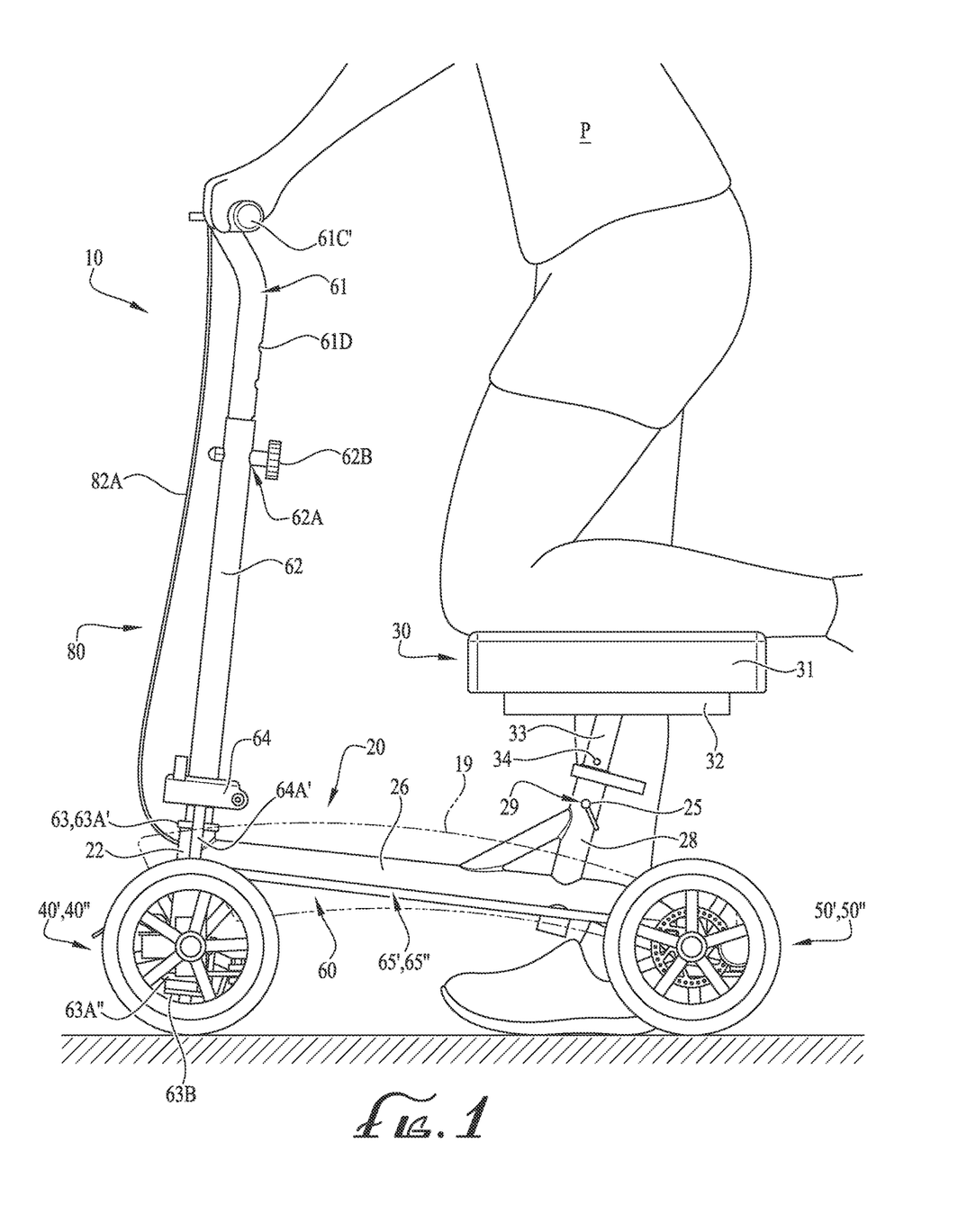
FIG. 1 is a side view of a knee walker in use according to an example embodiment of the present invention.

With reference now to the drawing figures, wherein like reference numbers represent corresponding parts throughout the several views, FIG. 1 shows a user on a knee walker 10 according to an example embodiment of the present invention. The knee walker 10 generally comprises a body frame 20, a cushion or kneeling-pad assembly 30, front axle assemblies 40' and 40", rear axle assemblies 50' and 50", and a four-wheel steering system 60. In some example embodiments, knee walker 10 further comprises a body frame cover or chassis 19.

The four-wheel steering system 60 allows the user to control the directional orientation or turning of the front axle assemblies 40' and 40" and rear axle assemblies 50' and 50" in tandem. Generally, the front axle assemblies 40' and 40" rotate in a first rotational or angular direction while the rear axle assemblies 50' and 50" rotate in an opposite second rotational or angular direction. For example, as the front axle assemblies 40' and 40" are rotated counter-clockwise, the rear axle assemblies 50' and 50" are caused to rotate in the opposite, clockwise direction, as shown in FIG. 3A. Conversely, if the front axle assemblies 40' and 40" are rotated clockwise, the rear axle assemblies 50' and 50" are rotated in the opposite, counter-clockwise direction, as shown in FIG. 3B. The opposing rotational alignment of the front axle assemblies 40' and 40" and the rear axle assemblies 50' and 50" enables the knee walker to achieve a tighter or smaller turning radius compared to traditional knee walkers with two-wheel steering. In the neutral position, the front axle assemblies 40' and 40" and rear axle assemblies 50' and 50" are collaterally aligned, as shown in FIG. 2.

Figure 2:
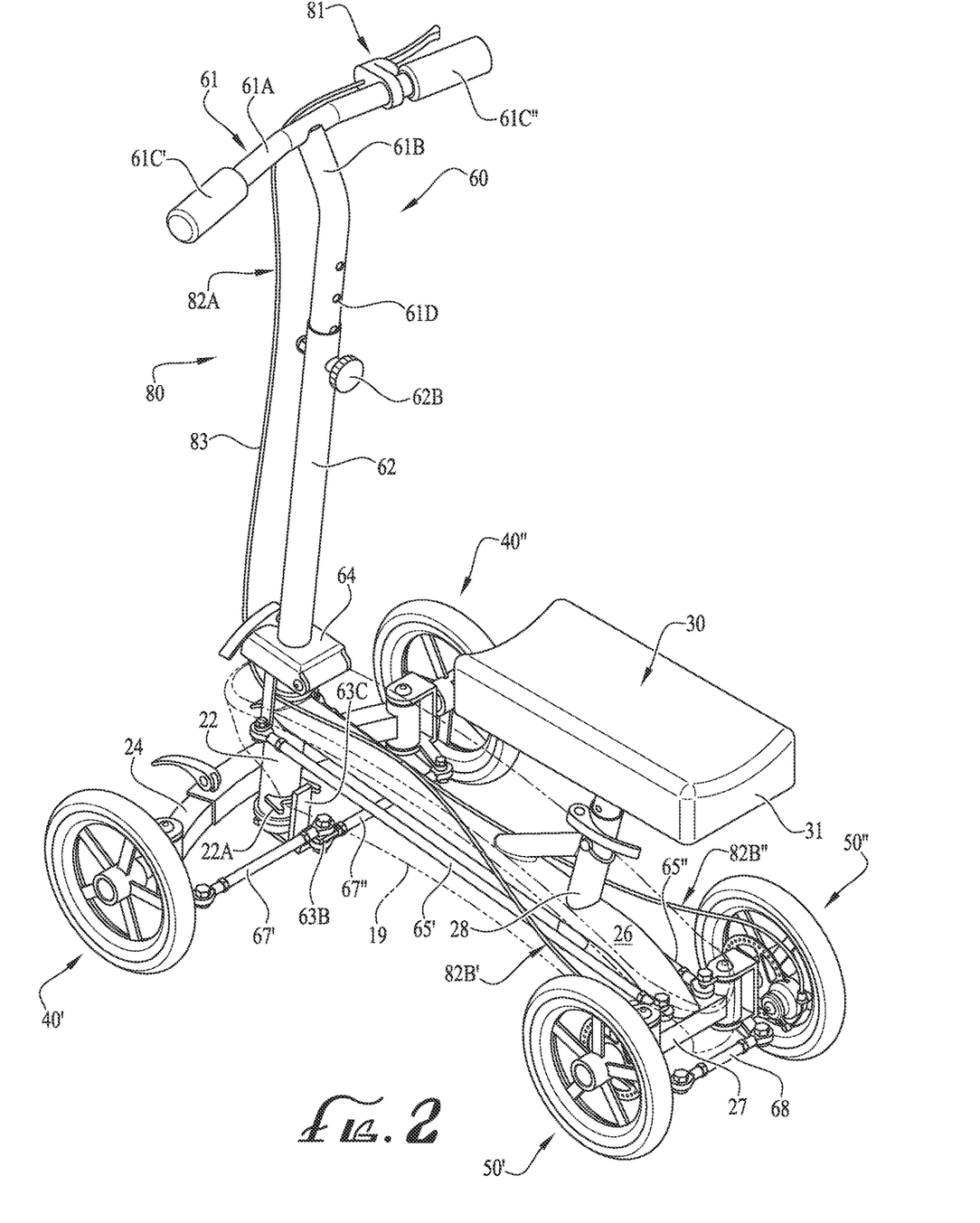
FIG. 2 is an isometric view of the knee walker of FIG. 1.
Figure 3A:
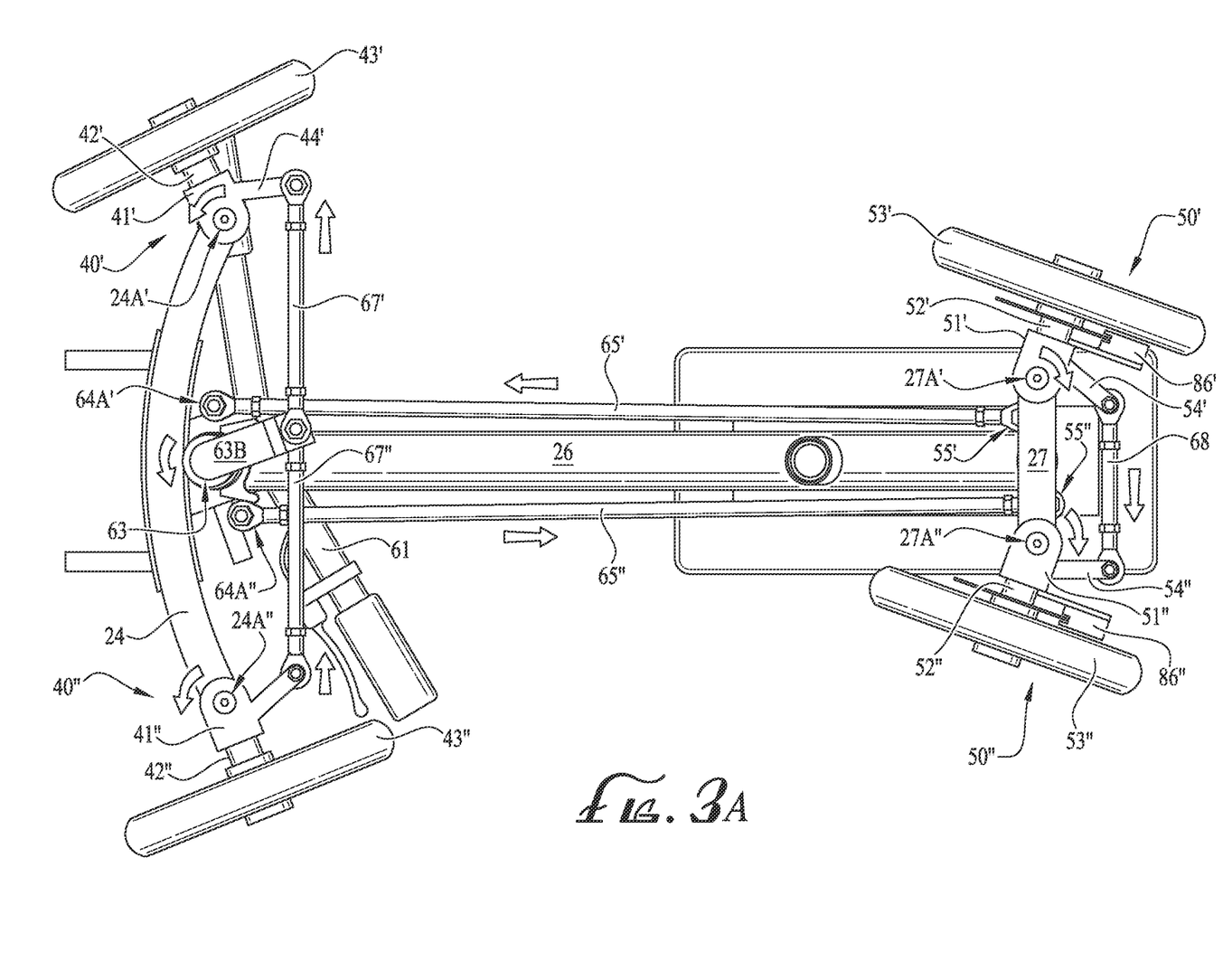
FIG. 3A is a bottom view of the knee walker of FIG. 1 in a right turn configuration.
Figure 3B:
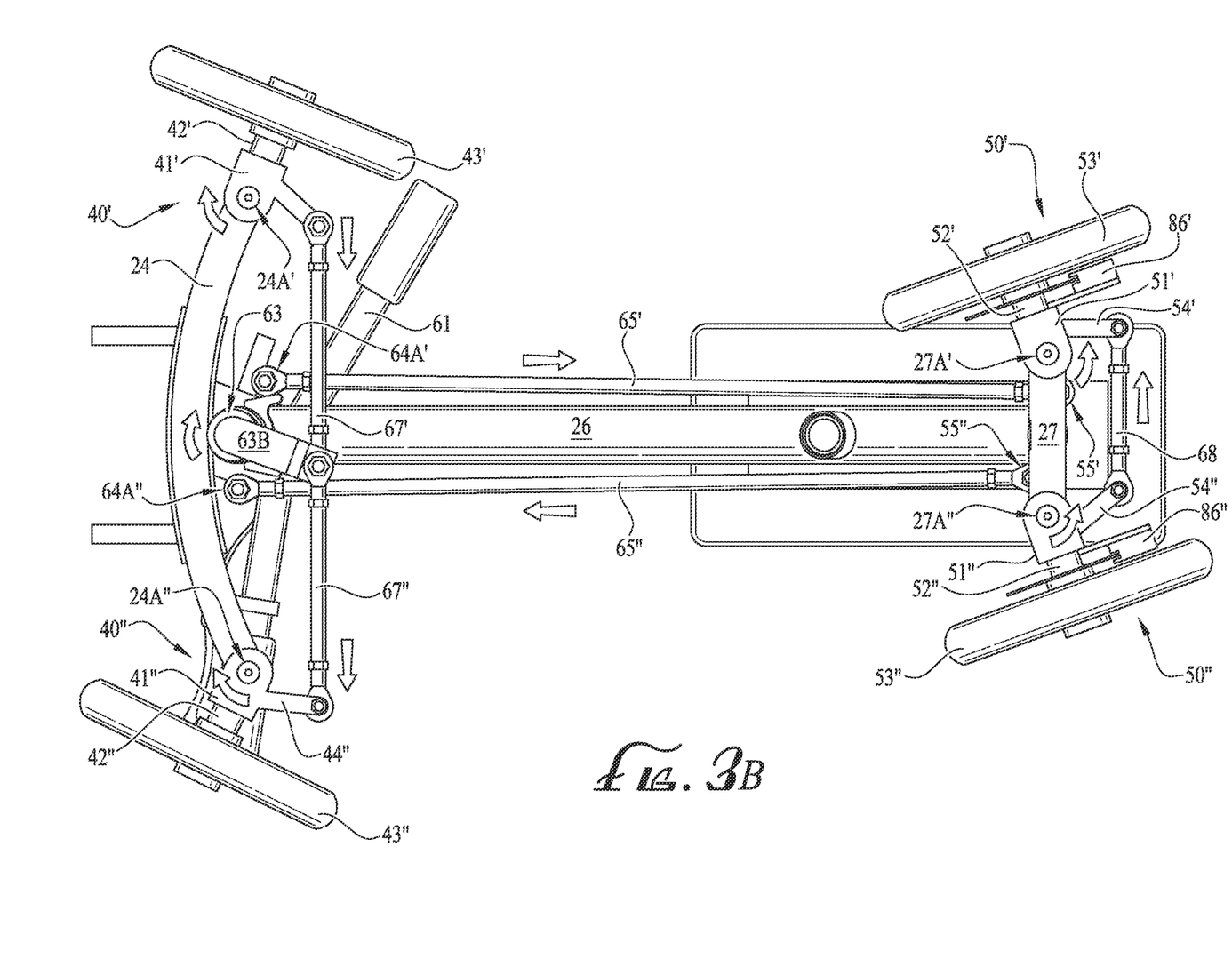
FIG. 3B is a bottom view of the knee walker of FIG. 1 in a left turn configuration.

As shown in FIGS. 1 and 2, body frame 20 generally comprises a head tube or sleeve 22, front crossbar or cross-member 24, a center crossbar or cross-member 26, a knee-pad tube or sleeve 28, and a rear crossbar or cross-member 27. Body frame 20 generally comprises a tubular structure and is preferably constructed from a rigid material, including, but not limited to, metals, polymers, fiber-reinforced plastics, and/or combinations thereof. As shown in FIG. 2, head tube 22 comprises a first, top end and a second, bottom end. At its second, bottom end, headtube 22 is welded, or otherwise affixed, to the front crossbar 24. In example embodiments, the front crossbar 24, spanning about 12-30 inches, preferably about 12-15 inches, or more preferably about 13.5 inches, is affixed at its center to the bottom end of head tube 22 and extends substantially perpendicular thereto. According to example embodiments, the front crossbar 24 has an arced or curved profile. However, the front crossbar 24 may comprise other profiles such as linear, angled, curved or any combination thereof. In example embodiments, front crossbar 24 comprises a left, proximal end 24A' and a right, distal end 24A" where each end comprises a cylindrical hinge or pivot body about which front axle assemblies 40' and 40" are hingeably secured as described below.

Figure 4:
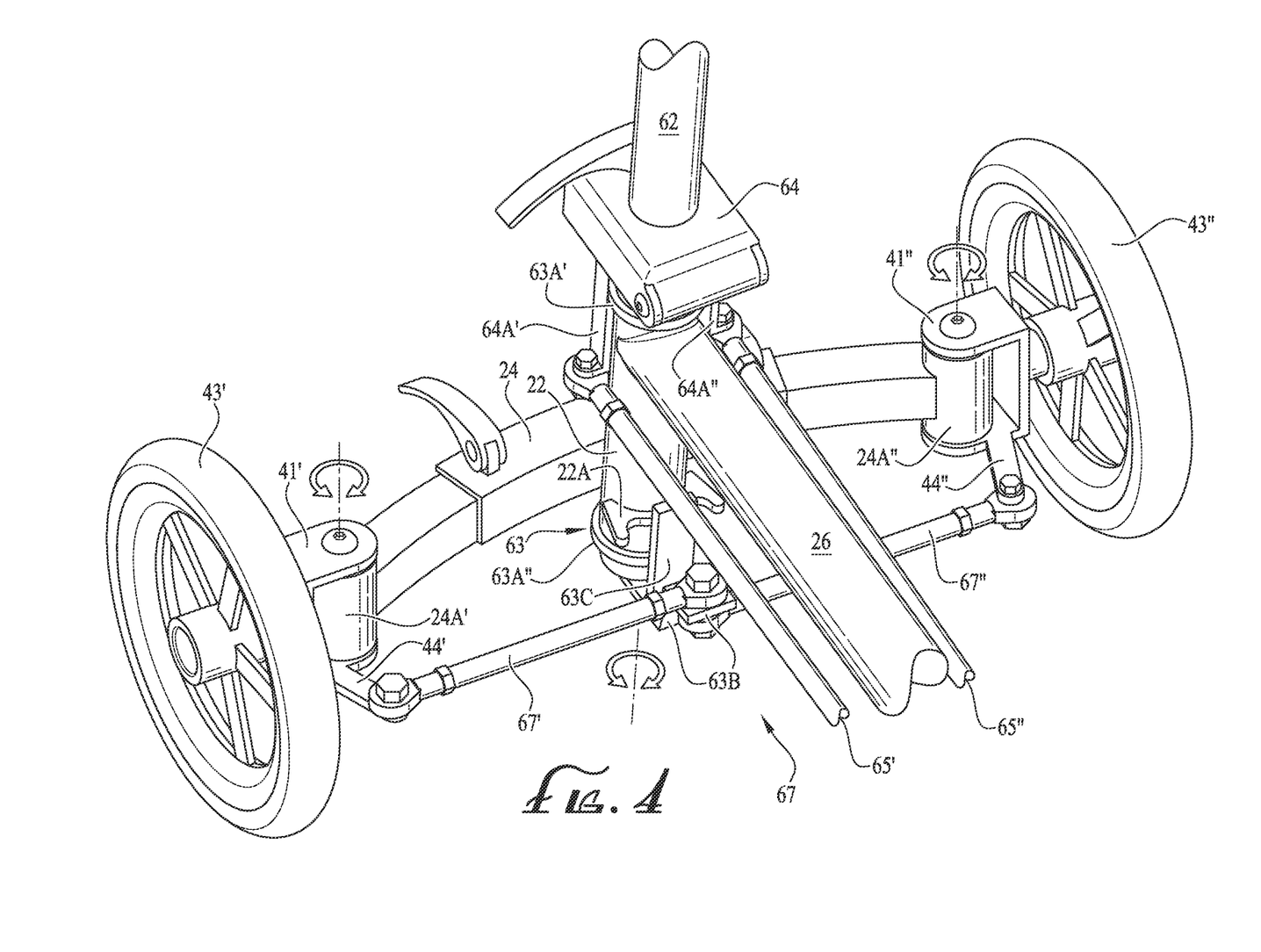
FIG. 4 shows additional details of a steering system and front axle assemblies at a front portion of the knee walker of FIG. 1.

As best shown in FIG. 4, front axle assemblies 40' and 40" are pivotally mounted to the left and right ends 24A', 24A" of the front crossbar 24, respectively. In the depicted embodiment, the left front axle assembly 40' comprises a left front axle bracket 41' having generally a C-shaped profile. The left front axle bracket includes a vertical portion or section having a top end and a bottom end. At its top end, the left front axle bracket includes a top prong or member which extends transversely from the vertical portion to a free end. The vertical portion also includes a bottom prong or member which extends transversely from the vertical portion to a free end in the same general direction of the top prong. The top and bottom members are generally positioned such that they are substantially parallel to one another and substantially perpendicular to the vertical portion. Space or gap is provided between the top and bottom horizontal prongs, the space or gap having sufficient area to receive the left end 24A' of the front crossbar 24. In depicted embodiments, the free ends of the top and bottom prongs are concentrically aligned with and pivotally mounted to the left end 24A' of the front crossbar 24, for example by a bolt or pivot pin.

In the example embodiments, the left front axle bracket 41' further comprises a left front axle 42' on which left front wheel 43' is rotatably mounted. The left front axle is generally secured to the vertical portion of the axle bracket and extends transversely from the vertical portion in a direction opposite the top and bottom horizontal prongs. In example embodiments, the left front axle 42' is a bolt or axle pin having a head end and a threaded end, wherein the bolt is secured to the left front axle bracket 41' by its threaded end and the left front wheel 43' is rotatably mounted on the bolt between the head and threaded ends. In other example embodiments, the left front axle 42' may be a fixed component of the left front axle 41' which extends transversely therefrom. Axle bracket 41' also includes a front tie-rod connection tab or member 44', as best shown in FIG. 4. The front tie-rod connection tab 44' is configured for mounting thereon one end of a front tie-rod 67' as described further below.

Similarly, in the depicted embodiment, the right front axle assembly 40" comprises a right front axle bracket 41" having generally a C-shaped profile. The right front axle bracket 41" includes a vertical portion or section having a top end and a bottom end. At its top end, the right front axle bracket includes a top prong or member which extends transversely from the vertical portion to a free end. The vertical portion also includes a bottom prong or member which extends transversely from the vertical portion to a free end in the same general direction of the top prong. The top and bottom members are generally positioned such that they are substantially parallel to one another and substantially perpendicular to the vertical portion. Space or gap is provided between the top and bottom horizontal prongs, the space or gap having sufficient area to receive the right end 24A" of the front crossbar 24. In depicted embodiments, the free ends of the top and bottom prongs are concentrically aligned with and pivotally mounted to the right end 24A" of the front crossbar 24, for example by a bolt or pivot pin.

In the example embodiments, the right front axle bracket 41" further comprises a right front axle 42" on which right front wheel 43" is rotatably mounted. The right front axle is generally secured to the vertical portion of the axle bracket and extends transversely from the vertical portion in a direction opposite the top and bottom horizontal prongs. In example embodiments, the right front axle 42" is a bolt or axle pin having a head end and a threaded end, wherein the bolt is secured to the right front axle bracket 41" by its threaded end and the right front wheel 43" is rotatably mounted on the bolt between the head and threaded ends. In other example embodiments, the right front axle 42" may be a fixed component of the left front axle 41' which extends transversely therefrom. Axle bracket 41" also includes a front tie-rod connection tab or member 44", as best shown in FIG. 4. The front tie-rod connection tab 44" is configured for mounting thereon one end of a front tie-rod 67" as described further below.

The center crossbar 26, having a front, proximal end and a rear, distal end, extends between the head tube 22 and rear crossbar 27. At its front end, center crossbar 26 is welded, or otherwise attached, to the vertical head tube 22 and extends generally transversely therefrom. At its rear end, center crossbar 26 is welded, or otherwise affixed, to the center of rear crossbar 27. In example embodiments, the center crossbar spans about 19-22 inches, or preferably about 20-21 inches, or more preferably about 20.5 inches. In the depicted embodiment, the center crossbar 26 is attached to and extends transversely from near the top end of head tube 22. In alternative embodiments, the center crossbar 26 may be attached to the bottom end of the head tube 22, the center of the head tube 22, or any position or location along the length of the head tube 22. In yet other example embodiments, there may be multiple center crossbars or support bars arranged in various configurations for increased stability and rigidity.

The center crossbar 26 also comprises a knee-pad tube or sleeve 28 configured to receive the knee-pad assembly 30 as described below. The knee-pad tube 28 comprises a top end and a bottom end and is hollow therethrough. The knee-pad tube generally extends transversely from the center crossbar and substantially perpendicular to the ground or riding surface. The location of the knee-pad tube 28 may vary along the length of the center crossbar 26 between its front and rear ends. Knee-pad tube 28 may also include a locking pin hole 29, a post collar lock, or other similar locking mechanisms to hold the knee-pad assembly in place during use. According to example embodiments, the knee-pad tube 28 is positioned on the center crossbar 26 at about 10-20 inches, preferably about 12-18 inches, or more preferably about 14-16 inches, from head tube 22 and is marginally angled relative to the ground. Alternatively, the knee-pad tube 28 is secured to the center crossbar 26 wherein the distance between the knee-pad tube and the front end of the crossbar is equal to or greater than, for example about 1.5-2 times, the distance between the knee-pad tube and the back end of the crossbar.

The cushion or knee-pad assembly generally comprises a cushion 31, a cushion base plate 32, and a cushion post 33.

In use, the user places one knee on the cushion or knee-pad 31 to reduce the pressure or force applied to the knee, lower leg, ankle, and/or foot. The cushion generally comprises a pliable or resilient core encased in an elastic shell or casing. According to the example embodiment, the cushion is made from resilient foam enveloped in a synthetic leather shell. In other example embodiments, the cushion core may comprise fillers such as rubbers, gels, natural and/or synthetic fibers, or other suitable materials known in the art. Similarly, the cushion casing may be constructed from natural or synthetic leather, natural or synthetic fibers, rubbers, or other suitable materials known in the art.

Cushion 31 generally comprises a top surface, a bottom surface, and a side surface between the peripheries of the top and bottom surfaces. According to example embodiments, the top surface of cushion 31 is contoured to provide greater support and stability. The cushion base plate or panel 32 is secured to the bottom surface of cushion 31 thereby providing structure and support to the cushion. The cushion post or column 33 is a tubular member secured to the cushion base plate 32. The cushion column 33 extends transversely from the cushion base plate 32 in the direction opposite cushion 31. The cushion column 33 comprises a plurality of through-holes 34 spaced equally apart along its length. The through-holes 34 are configured to align with the locking pin hole 29 on knee-pad tube 28. In example embodiments, the knee-pad assembly 30 is secured to the body frame 20 by inserting the cushion post 33 into knee-pad tube 28 and locking the knee-pad assembly 30 to the body frame 20, for example by using a locking pin 25. The height of the knee-pad or cushion 31 may be adjusted between a plurality of predetermined intervals by aligning the appropriate cushion column through-hole 34 to the locking pin hole 29 and securing the position with locking pin 25. In alternative embodiments, locking pin 25 may be replaced with, or used in addition to, other post locking mechanisms known in the art, including, but not limited to, locking knobs, locking buttons, post clamps, and split collar locks. In example embodiments, the height of cushion 31 is adjustable between about 12-26 inches, or preferably about 16-22.5 inches, from the ground or riding surface.

The rear crossbar 27 is affixed at its center to the distal end of center crossbar 26 and extends substantially perpendicular thereto. In example embodiments, the rear crossbar 27, comprising a left, proximal end 27A' and a right, distal end 27A", spans about 4-7 inches, preferably about 4.5-6.5 inches, or more preferably 5.5 inches. At each end, rear crossbar 27 comprises a cylindrical hinge or pivot body about which rear axle assemblies 50' and 50" are hingeably secured as described below. According to example embodiments, the rear crossbar 27 has a linear profile. However, the rear crossbar 27 may comprise other profiles such as arced, angled, curved or any combination thereof.

Figure 5:
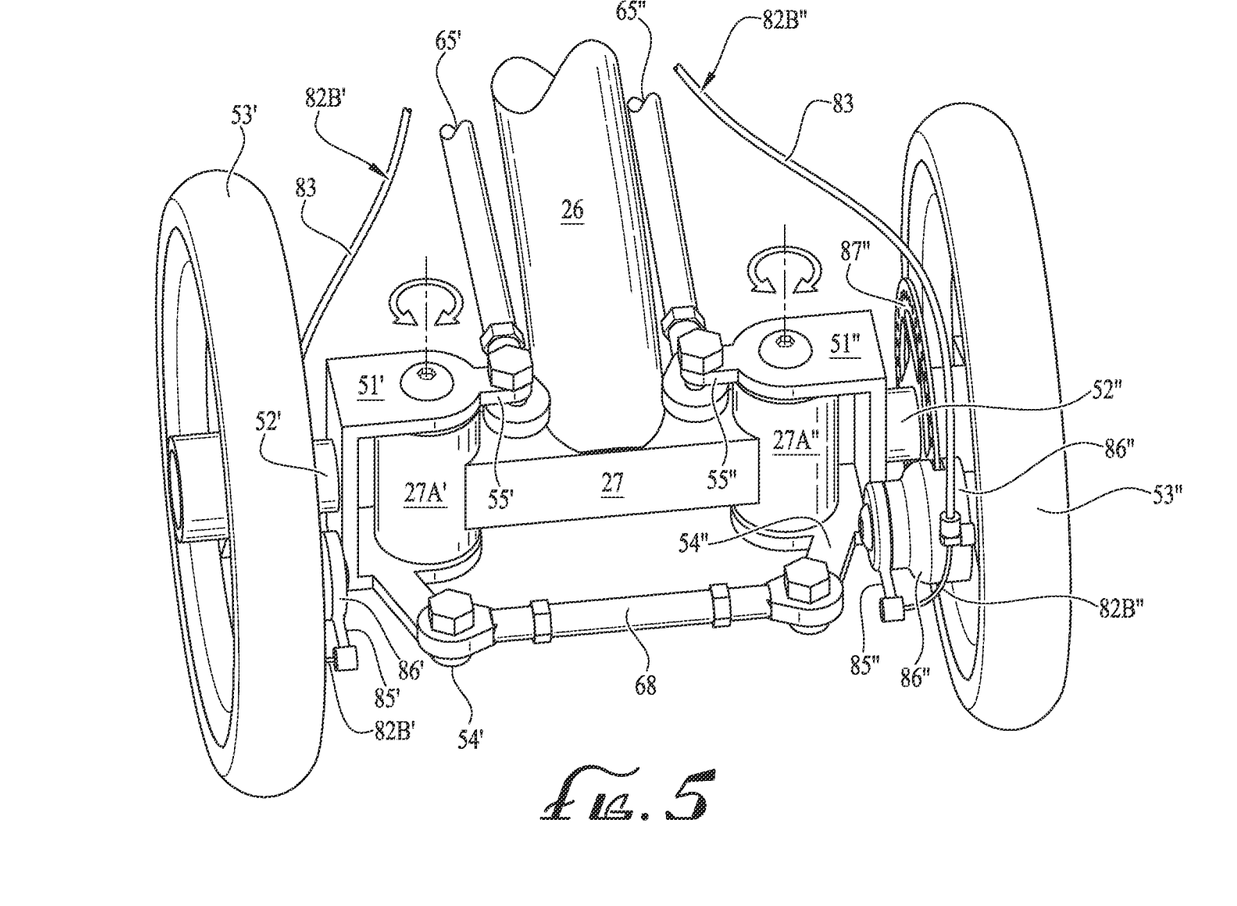
FIG. 5 shows additional details of the steering system and rear axle assemblies at a rear portion of the knee walker of FIG. 1.

As shown in FIGS. 2 and 5, the rear axle assemblies 50' and 50" are pivotally attached to the left, proximal end 27A' and right, distal end 27A" of the rear crossbar 27, respectively. In the depicted embodiment, the left rear axle assembly 50' comprises a left rear axle bracket 51' having generally a C-shaped profile. The left rear axle bracket includes a vertical portion or section having a top end and a bottom end. At its top end, the left rear axle bracket includes a top prong or member which extends transversely from the vertical portion to a free end. The vertical portion also includes a bottom prong or member which extends transversely from the vertical portion to a free end in the same general direction of the top prong. The top and bottom members are generally positioned such that they are substantially parallel to one another and substantially perpendicular to the vertical portion. Space or gap is provided between the top and bottom horizontal prongs, the space or gap having sufficient area to receive the left end 27A' of the rear crossbar 27. In depicted embodiments, the free ends of the top and bottom prongs are concentrically aligned with and pivotally or rotationally mounted to the left end 27A' of the rear crossbar 27, for example by a bolt or pivot pin.

According to example embodiments, the left rear axle bracket 51' further comprises a left rear axle 52' on which left rear wheel 53' is rotatably mounted. The left rear axle is generally secured to the vertical portion of the axle bracket and extends transversely from the vertical portion in the direction opposite the top and bottom horizontal prongs. In example embodiments, the left rear axle 52' is a bolt or axle pin having a head end and a threaded end, wherein the bolt is secured to the left rear axle bracket 51' by its threaded end and the left rear wheel 53' is rotatably mounted on the bolt between the head and threaded ends. In other example embodiments, the left rear axle 52' may be a fixed component of the left rear axle 51' which extends transversely therefrom. Axle bracket 51' also includes a rear tie-rod connection tab or member 54' and a center tie-rod connection tab or member 55', as best shown in FIG. 5. The rear tie-rod connection tab 54' is configured for mounting thereon one end of a rear tie-rod 68 as described further below. Similarly, the center tie-rod connection tab 55' is configured for mounting thereon one end of a left center tie-rod 65' as described below.

Similarly, in example embodiments, the right rear axle assembly 50" comprises a right rear axle bracket 51" having generally a C-shaped profile. The right rear axle bracket includes a vertical portion or section having a top end and a bottom end. At its top end, the right rear axle bracket includes a top prong or member which extends transversely from the vertical portion to a free end. The vertical portion also includes a bottom prong or member which extends transversely from the vertical portion to a free end in the same general direction of the top prong. The top and bottom members are generally positioned such that they are substantially parallel to one another and substantially perpendicular to the vertical portion. Space or gap is provided between the top and bottom horizontal prongs, the space or gap having sufficient area to receive the right end 27A" of the rear crossbar 27. In depicted embodiments, the free ends of the top and bottom prongs are concentrically aligned with and pivotally or rotationally mounted to the right end 27A" of the rear crossbar 27, for example by a bolt or pivot pin.

In example embodiments, the left rear axle bracket 51' further comprises a right rear axle 52" on which a right rear wheel 53" is rotatably mounted. The left rear axle is generally secured to the vertical portion of the axle bracket and extends transversely away from the vertical portion in the direction opposite the top and bottom horizontal prongs. In example embodiments, the right rear axle 52" is a bolt or axle pin having a head end and a threaded end, wherein the bolt is secured to the right rear axle bracket 51" by its threaded end and the right rear wheel 53" is rotatably mounted on the bolt between the head and threaded ends. In other example embodiments, the right rear axle 52" may be a fixed component of the right rear axle 51" which extends transversely therefrom. Axle bracket 51" also includes a rear tie-rod connection tab or member 54" and a center tie-rod connection tab or member 55", as best shown in FIG. 5. The rear tie-rod connection tab 54" is configured for mounting thereon an end of the rear tie-rod 68 opposite the end mounted to the left rear tie-rod connection tab 54', as described further below. Similarly, the center tie-rod connection tab 55" is configured for mounting thereon one end of a right center tie-rod 65" as described below.

According to example embodiments, the front and rear wheels 43', 43", 53', 53" comprise 8-inch polyurethane or hard rubber tires. In alternate embodiments, the wheels comprise 12-inch air-filled or pneumatic knobby all-terrain tires. The wheel diameters may vary depending on the application, for example between about 4-18 inches, between about 6-14 inches, or between about 8-12 inches. The wheels may also comprise tires manufactured from other suitable materials known in the art.

The steering system 60 comprises a T-bar steering handlebar 61, a steering column 62, a steering column sleeve 63, a steering yoke or mount 64, center tie-rods 65' and 65", a steering or pitman arm 63B, front tie-rods 67' and 67", and a rear tie-rod 68, as shown in FIGS. 1-5. T-bar handlebar 61 comprises a horizontal handle portion 61A and a vertical column portion 61B. The horizontal handle portion includes handle grips 61C' and 61C" secured to each end of the horizontal handle portion 61A, and a brake handle or lever 81 configured to operate a brake system 80, as described below. In example embodiments, vertical column 61B extends transversely from the center of the horizontal handle portion 61A and includes a plurality of holes 61D along its length for adjusting the height of the handlebar 61, as shown in FIG. 2. In example embodiments, vertical column 61B has an outer diameter smaller than the inner diameter of the steering column 62, allowing the vertical column to be inserted into or pass through within the steering column 62. The steering column 62 features a locking pin or through hole 62A which aligns to the plurality of holes 61D on handlebar 61. In use, the height of the handlebar 61 may be adjusted and locked or secured to a user-preferred height by aligning the locking pin hole 62A to one of the plurality of holes 61D on the handlebar and inserting or engaging a locking pin 62B, locking knob, locking button, or other suitable locking mechanisms or systems for telescoping components. In example embodiments, the height of handle bar 61 and handle grips 61C' and 61C" is adjustable between about 24-48 inches, or preferably about 30-41 inches, from the ground or riding surface.

The steering column 62 generally has a tubular structure comprising a top end and a bottom end. The top end of the steering column is configured to receive the bottom end of the vertical portion 61B of the handlebar 61, as described above. The bottom portion of the steering column 62 is inserted into the steering column sleeve 63. Steering column 62 is detachably locked or secured to the steering column sleeve 63 such that they operate as a single component when assembled while enabling disassembly as needed for easy storage and/or transportation. The steering column sleeve 63, having a top end and a bottom end, includes a top expanded lip 63A' at its top end and a bottom expanded lip 63A" at its bottom end, as best shown in FIG. 4. The steering column sleeve 63 is passed through the head tube 22 and confined therein between the top and bottom expanded lips of the steering column sleeve. The steering column sleeve is thereby prevented from being removed from head tube 22 while still being able to rotate axially therein. Effectively, handlebar 61, steering column 62, and steering column sleeve 63 rotate or pivot axially in unison within the head tube 22 during use. However, the handlebar and the steering column may be disassembled from each other and from the steering column sleeve and head tube as needed for, for example, easier storage and/or transportation.

As best shown in FIG. 4, steering column sleeve 63 further comprises a steering arm 63B having a fixed end and a free end. Generally, the fixed end is welded, or otherwise attached, to the bottom expanded lip 63A" of the steering column 63 and front tie-rods 67' and 67" are secured to the opposite, free end. In example embodiments, as the user rotates the handlebar 61, steering column sleeve 63 is rotated about its axial axis inside head tube 22 thereby pivoting the steering arm 63B about its fixed end. As the free end of the steering arm 63B moves arcuately, the front tie-rods 67' and 67" are driven by the steering arm wherein the angular or rotational motion of the free end of the steering arm translates the front tie-rods laterally. In the depicted embodiment, the steering arm 63B extends transversely from the bottom expanded lip 63A" towards the rear of the knee walker. In the depicted embodiment, steering arm 63B comprises a Z-shaped profile but the profile need not be so limited. The steering arm may comprise, for example, other flat, arced, or angled profiles, or any combination thereof.

As further shown in FIG. 4, steering arm 63B comprises a turn-stop post 63C extending transversely therefrom. The turn-stop post is configured to engage a turn-stop guide 22A mounted on the head tube 22. The turn-stop guide protrudes laterally from head tube 22 and includes a contoured groove or notch between two extended protrusions which act as bumpers or backstops for the turn-stop post 63C. For example, when the user rotates the handlebar 61, steering arm 63B pivots about the axial axis of the steering column sleeve 63 and steering column 62. During normal operations, the turn-stop post 63C moves freely within the contoured notch of the turn-stop guide 22A. However, if the handlebar is rotated too much, the turn-stop post collides with the extended protrusions on either side of the contoured notch and the turn-stop post, and effectively handlebar 61, is prevented from rotating any further. In example embodiments, the turn-stop guide prevents the user from overturning the handlebar thereby preventing unintended accidents, such as for example, abrupt turns or over-extending the center tie-bars.

As shown in FIG. 4, the steering yoke or mount 64 is affixed to the top end of steering column sleeve 63. Generally, center tie-rods 65' and 65" are coupled to the steering mount 64 which transfers the rotational motion of the handlebar to the center tie-rods as described in more detail below. In example embodiments, steering mount 64 comprises a main body with a pair of flanges or extensions 64A' and 64A" for mounting the front, proximal ends of center tie-rods 65' and 65". The left vertical flange 64A' is generally affixed to a first, left side of the steering mount body. Similarly, the right vertical flange 64A" is generally affixed to a second, right side of the steering mount body. The free ends of the left and right flanges 64A', 64A" are configured for securing thereon ends of center tie-rods 65' and 65", for example by mechanical fasteners, such as for example bolts or rivets. In other example embodiments, center tie-rods 65' and 65" may be welded, or otherwise permanently affixed, to flanges 64A' and 64A", respectively. In still other example embodiments, the front, proximal ends of the center tie-rods 65' and 65" may be mounted directly to the steering mount 64.

Generally, knee walker 10 comprises a system or plurality of tie-rod connectors which assist in the transfer of the operation and movement of the handlebar 61 to the front and rear axle assemblies 40', 40", 50', and 50". In example embodiments, front tie-rods 67' and 67"—each having two opposing ends—connect the front axle assemblies 40' and 40" to the steering arm 63B, as best shown in FIGS. 3A-3B. For example, at its first end, the left front tie-rod 67' is secured to tie-rod connector member 44' of left front axle assembly 40' while its second end is secured to the steering arm 63B. Similarly, the right front tie-rod 67" is secured to the steering arm 63B at its first end and secured to tie-rod connector member 44' of the right front axle assembly 40" at its second end. As shown in FIGS. 2-5, the center tie-rods 65' and 65" act as linkages between the steering mount 64 and rear axle assemblies 50' and 50". In example embodiments, both left and right center tie-rods 65' and 65" comprise a first, front end and a second, rear end. The front end of the left center tie-rod 65' is secured to the left vertical flange 64A' of steering mount 64 while the rear end is secured to the center tie-rod connector member 55' of the left rear axle assembly 50'. Similarly, the front end of the right center tie-rod 65" is secured to the right vertical flange 64A" of steering mount 64 while the rear end is secured to the center tie-rod connector member 55" of the right rear axle assembly 50". As shown in FIG. 5, the rear tie-rod 68 connects the left rear axle assembly 50' to the right rear axle assembly 50". In example embodiments, rear tie-rod 68 comprises a first, proximal end and a second, distal end wherein its first, proximal end is secured to the rear tie-rod connector member 54' of the left rear axle assembly 50' and its second, distal end is secured to the rear tie-rod connector member 54" of the right rear axle assembly 50".

In example methods or modes of use, knee walker 10 provides ambulatory assistance to its users. Generally, the user places one knee on the knee cushion or knee-pad 31 to reduce any pressure or force applied to an injured foot and/or lower leg while walking or moving by pushing off with their uninjured foot and leg to roll the walker 10 forward or back. Handlebar 61 is provided for operating and maneuvering the knee walker. When fully assembled, handlebar 61, steering column 62, and steering column sleeve 63 are coupled together and rotate synchronously within head tube 22. As the user rotates the handlebar, the steering arm 63B and steering mount flanges 64A' and 64A" also hinge or rotate about the axial axis of head tube 22. When the free end of the steering arm 63B moves, its arcuate motion pushes and pulls the front tie-rods 67' and 67" laterally which in turn drives the front axle assemblies 40' and 40". For example, as shown in FIG. 3A, when the handlebar 61 is rotated counter-clockwise, the steering arm 63B hinges about its fixed end, or axial axis of steering column sleeve 63. As a result, the free end of the steering arm 63B pushes left front tie-rod 67' towards the left front axle assembly 40' wherein the left front tie-rod 67' in turn pushes front tie-rod connector 44' and drives left front axle assembly 40' to rotate about the left end 24A' of front crossbar 24. At the same time, as the steering arm 63B hinges about the axial axis of the steering column sleeve, the free end of the steering arm pulls the right front tie-rod 67" towards the left front axle assembly 40' which in turn causes right front axle assembly 40" to rotate counter-clockwise about right end 24A" of front crossbar 24.

The rotation of the handlebar 61 also rotates the steering mount 64 and its flanges 64A' and 64A". As the left and right steering mount flanges 64A', 64A" rotate about the axial axis of the steering column sleeve, one flange pulls one center tie-rod while the other flange pushes the other center tie-rod. For example, as shown in FIG. 3A, when the handlebar is rotated counter-clockwise, left steering mount flange 64A' pulls left center tie-rod 65' towards the front of the knee walker and right steering mount flange 64A" pushes right center tie-rod 65" towards the rear of the knee walker. In turn, the left center tie-rod pulls the left center tie-rod connector 55' towards the front of the knee walker and thereby rotates the left rear axle assembly 50' clockwise about left end 27A' of rear crossbar 27. At the same time, the right center tie-rod 65" pushes the left center tie-rod connector 55" towards the rear of the knee walker and thereby rotates the right rear axle assembly 50" clockwise about right end 27A" of rear crossbar 27. The rear tie-rod 68 secured to rear tie-rod connector members 54' and 54" provides additional linkage between the rear axle assemblies 50' and 50". The additional linkage reinforces the interconnection between the steering mount, center tie-rods, and rear axle assemblies, and improves the responsiveness of the overall system.

According to example embodiments, knee walker 10 further includes a brake system 80. The brake system comprises a brake handle 81; brake cables or lines 82A, 82B', and 82B"; brake line anchors 84' and 84"; brake levers 85' and 85"; brake housings 86' and 86"; and brake rotors or discs 87' and 87". As shown in FIG. 2, brake handle 81 is generally secured to the handlebar 61 near one of the handle grips. For example, in the depicted embodiment, the brake handle is attached to the handlebar near the right handle grip 61C". However, the brake handle may be provided near the left handle grip 61C', or near both left and right handle grips.

In example embodiments, a single brake line 82A extends out from brake handle 81 but is later split into two separate brake lines 82B' and 82B". Brake line 82B' leads to the left brake housing 86' attached to the left rear axle bracket 51'. Brake line 82B" leads to the right brake housing 86" attached to the right rear axle bracket 51". The brake lines are generally sheathed inside a polyurethane sheath or sleeve 83; however, sheath 83 may also be made from natural or synthetic rubbers, fibers, or other suitable materials. In example embodiments, brake lines 82B' and 82B" are secured to brake levers 85' and 85", respectively, as shown in FIG. 5. Brake levers 85' and 85" are pivotally mounted to the brake housings 86' and 86", respectively. The brake housings enclose brake calipers (not shown) which are actuated by the brake levers and are configured to apply pressure to the brake rotors 87' and 87" to slow or stop the rear wheels as needed. The brake discs are affixed to the rear axles such that motion of the rear wheels are locked to the motion of the brake discs. In other words, for example, the left brake disc and left rear wheel rotate together as a unitary body. In example embodiments, brake lines 82A, 82B' and 82B" are typically made from twisted or braided steel but may also be constructed from other metals, natural and/or synthetic fibers and fiber composites, plastics, or other suitable materials.

In use, the user clenches or contracts the brake handle 81 by squeezing their hand to apply the brakes as needed. The contraction of the brake handle causes brake lines 82B' and 82B" to be pulled forward towards the front of the knee walker. The pull of the brake lines causes brake levers 85' and 85" to pivot which in turn actuates the brake calipers causing them to engage and apply resistive pressure on the brake rotors. Because brake lines 82B' and 82B" are split from a single brake line 82A, actuation of the left and right brakes occurs simultaneously.

Figure 6:
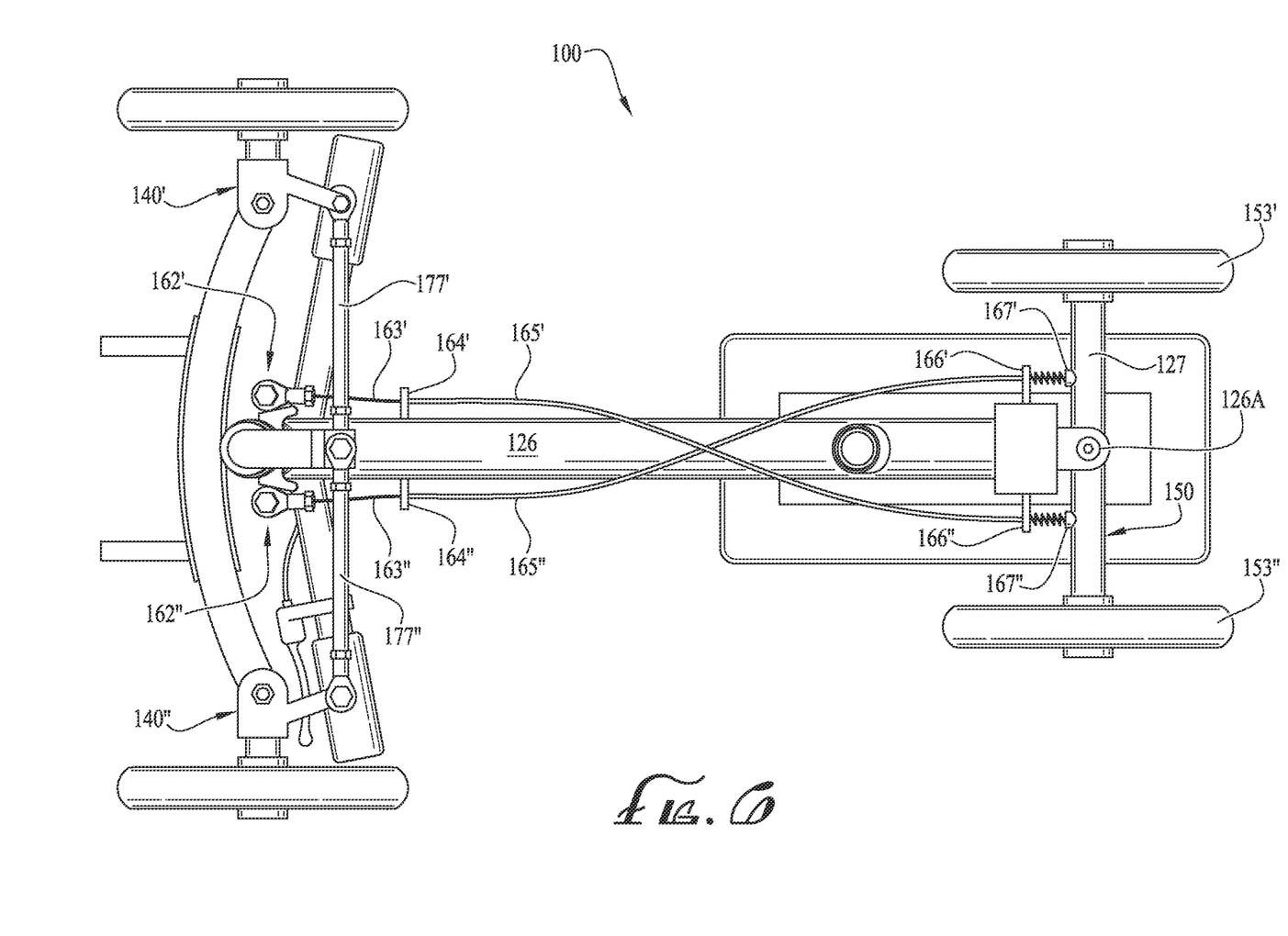
FIG. 6 is a bottom view of the knee walker according to another example embodiment of the present invention.

According to another example embodiment of the present invention, and with reference to FIG. 6, a knee walker 100 comprises a four-wheel cable-actuated steering system. The cable steering system generally replaces the center tie-rods of knee walker 10 with durable cables, for example made from twisted or braided steel. Knee walker 100 comprises a center crossbar 126 having a front, proximal end and a rear, distal end. At its rear, distal end, the center crossbar 126 comprises a hinge mechanism 126A. The hinge mechanism is configured to receive and secure a rear axle assembly 150. The rear axle assembly comprises a rear crossbar 127 having a left, first end and a right, second end, a left rear wheel 153' rotatably mounted to the left end of the rear crossbar 127, and a right rear wheel 153" rotatably mounted to the right end of the rear crossbar 127. The rear crossbar 127 is pivotally secured to the hinge mechanism 126A, for example by a pivot pin or bolt, about its center. The rear crossbar 127 further comprises steering cable anchor points 167' and 167" equal distances apart from the rear crossbar's center. In the example embodiment, rear crossbar 127 has a tubular structure and spans about 4-12 inches, preferably about 5-10 inches, and more preferably about 6-8 inches. The cable anchors 167' and 167" are secured about 1-4 inches, or preferably 2-3 inches, from the rear crossbar's center.

According to the example embodiment, the knee walker comprises two steering cables—a first steering cable 163' and a second steering cable 163", as shown in FIG. 6. The steering cables are typically made from twisted or braided steel but may also be constructed from other metals, natural and/or synthetic fibers and fiber composites, plastics, or other suitable materials. The first steering cable 163' is secured to the left steering mount flange 162' at its first, front end and to the right rear axle anchor 167" at its second, rear end. The second steering cable 163" is secured to the right steering mount flange 162" at its first, front end and left rear axle anchor 167' at its second, rear end. Both steering cables 163' and 163" are loosely retained adjacent to the center crossbar 126 at predetermined points along its length. In the depicted embodiment, steering cables 163' and 163" are guided through retaining elements or points 164', 164", 166', and 166" to maintain the steering cables along the length of the center crossbar and prevent any unwanted entanglement. In example embodiments, the steering cables are further at least partially encased in a polyurethane sheaths or sleeves 165' and 165". In other example embodiments, sheaths 165' and 165" may be made from natural or synthetic rubbers, fibers, or other suitable materials.

According to the depicted embodiment, crossing of the steering cables 163' and 163" across the center crossbar forces the rear axle assembly 150 to rotate in the opposite direction from the handlebar 161 and front axle assemblies 140' and 140". The opposing rotations of the front and rear axle assemblies allow knee walker 100 to achieve a smaller turning radius. For example, when the user rotates the steering handlebar 161 in the clockwise direction, front axle assemblies 140' and 140" are rotated in the same clockwise direction via tie rods 177' and 177". Simultaneously, the steering mount is rotated in the same clockwise direction which rotates forward the right steering mount flange 162" placing steering cable 163" under tension. As a result of the tension in the steering cable 163", the left anchor point 127' and left end of the rear crossbar 127 is pulled forward, rotating the rear axle assembly 150 in a counter-clockwise direction, opposite the front axle assemblies 140' and 140". Conversely, turning the handlebar 161 in the counter-clockwise direction causes the rear axle assembly 150 to rotate in the opposite, clockwise direction. Opposing rotations of the front and rear axle assemblies eliminate rear wheel drag and improve the effective turning radius of the knee walker. In this manner, tighter turns and improved maneuverability, relative to previously known knee walkers, are achieved. Improved stability may also be provided, for example due to shifting the turning or yaw axis toward, or coincident with, the center of gravity of the walker and person carried thereon, for example to a position at or around the knee cushion.

In some example embodiments, the knee walker may comprise a steering system comprising only cables or chains. In other example embodiments, the knee walker may comprise a steering system comprising a rack-and-pinion. In yet other example embodiments, the knee walker may comprise steering systems incorporating hydraulics, chain-and-gear, and/or belt-and-wheel mechanisms operably configured to provide four-wheel steering. Motors and electronic actuators may be further incorporated to fully or partially automate the operation of the steering system.

While the invention has been described with reference to example embodiments, it will be understood by those skilled in the art that a variety of modifications, additions and deletions are within the scope of the invention, as defined by the following claims.

What is claimed is:

1. A knee walker comprising
    a body frame having a center crossbar, a front crossbar connected to a first end of the center crossbar, a rear crossbar connected to a second end of the center crossbar and a steering column pivotally connected to the first end of the center crossbar,
    a first front axle assembly hingeably attached to a first end of the front crossbar,
    a second front axle assembly hingeably attached to a second end of the front crossbar,
    a first rear axle assembly hingeably attached to a first end of the rear crossbar, and
    a second rear axle assembly hingeably attached to a second end of the rear crossbar,
    wherein the first and second front axle assemblies are connected to the steering column by one or more first linkage mechanisms and the first and second rear axle assemblies are connected to the steering column by one or more second linkage mechanisms, and
    wherein, when the steering column is rotated in a first direction, the first and second front axle assemblies rotate in the same first direction and the one or more rear axle assemblies rotate in a second direction opposite the first direction.

2. The knee walker of claim 1, wherein the first and second linkage mechanisms are tie-rods.

3. The knee walker of claim 1, wherein the first linkage mechanisms are tie-rods and the second linkage mechanisms are cables.

4. The knee walker of claim 3, wherein the cables comprise twisted or braided steel cables.

5. The knee walker of claim 1, wherein the rear axle assemblies are connected to one another by a third linkage mechanism.

6. The knew walker of claim 5, wherein the first, second, and third linkage mechanisms are tie-rods.

7. The knee walker of claim 5, wherein at least one of the first, second, or third linkage mechanisms is a cable.

8. The knee walker of claim 1, wherein each of the front and rear axle assemblies comprises a wheel having an axial axis and each axle assembly is configured to hinge about an axis substantially perpendicular to the axial axis.

9. The knee walker of claim 1, further comprising a knee pad attached to the body frame.

* * * * *